June 12, 1962 D. P. WELLES, JR., ETAL 3,038,253
METHOD OF CONTRACTING A HOLE AND TOOL THEREFOR
Filed April 28, 1958 2 Sheets-Sheet 1
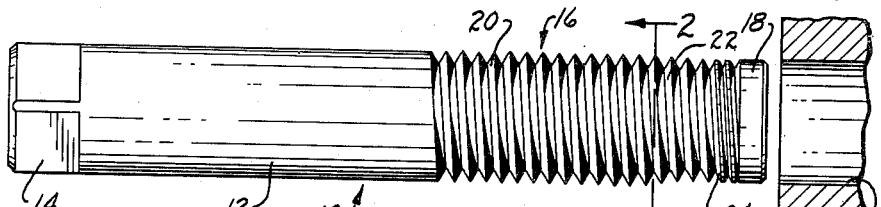
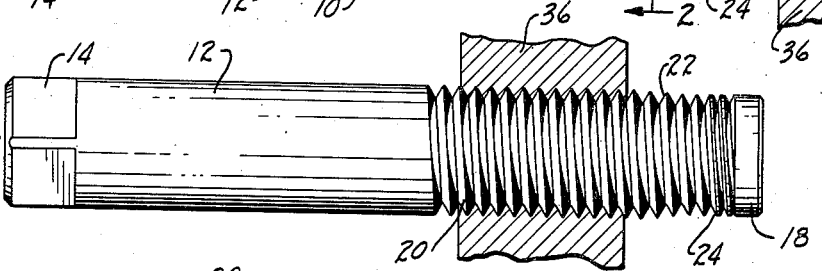
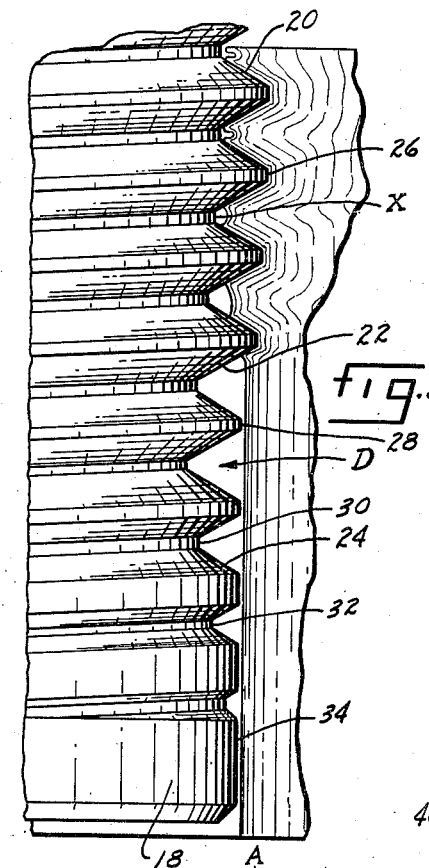
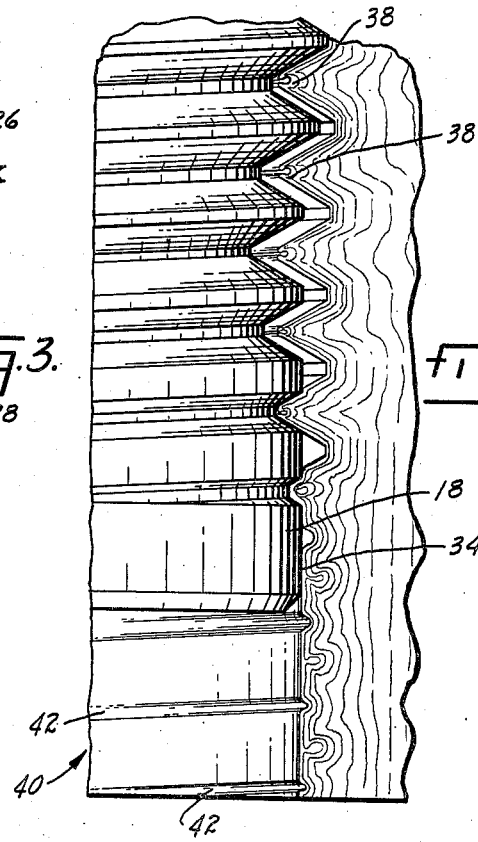
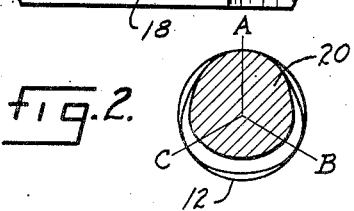
INVENTORS.
DONALD P. WELLES JR.
KEITH A. HILL
BY
Parker and Carter
ATTORNEYS.

June 12, 1962   D. P. WELLES, JR., ETAL   3,038,253
METHOD OF CONTRACTING A HOLE AND TOOL THEREFOR
Filed April 28, 1958   2 Sheets-Sheet 2

INVENTORS.
DONALD P. WELLES JR.
KEITH A. HILL
BY
*Parker and Carter*
ATTORNEYS.

United States Patent Office 3,038,253
Patented June 12, 1962

3,038,253
METHOD OF CONTRACTING A HOLE AND TOOL THEREFOR
Donald P. Welles, Jr., Rockford, and Keith A. Hill, Rockton, Ill., assignors to Besly-Welles Corporation, South Beloit, Ill., a corporation of Illinois
Filed Apr. 28, 1958, Ser. No. 731,528
10 Claims. (Cl. 29—567)

This invention is in the field of metal working tools and methods and is concerned with sizing a cylindrical surface, for example a hole.

In many situations, it is desirable to reduce the size of a hole in a ductile part. The hole may have become worn due to extensive use, for example the bore of a valve guide, or it might be slightly too large when originally made due to simple inaccuracies or errors in production. In a worn part, it is desirable to decrease the effective diameter of the hole, otherwise the part must be replaced. On new equipment, the oversized hole may be one of many holes in a single part, all of the others having the proper diameter, and unless the oversized hole can be reduced, the entire part will have to be scrapped.

Not only holes but external cylindrical surfaces, such as shafts, rods, etc. have the same problem, and in many situations it is desirable to build up or increase the diameter so as to save either an original or an old and worn part.

For purposes of simplicity, we shall refer to only a hole and the use of a tap type tool. But it should be understood that, in many instances, the entire procedure may be reversed or turned inside out and could be a die working on a shaftlike object or workpiece.

Accordingly, a primary object of our invention is a simple but efficient method of resizing a cylindrical surface, be it external or internal.

Another object is a method of reducing a hole size by working the metal without cutting or removing any of it.

Another object is a method of reducing the effective diameter of a hole, and at the same time applying oil or lubrication channels thereto.

Another object is a method of hole reduction with a tap type device which requires a minimum of torque.

Another object is a hole sizing operation which workhardens the inner surface of the hole.

Another object is a method of reducing the size of a hole which is particularly advantageous with ductile metals but not limited thereto.

Another object is a tool for hole sizing or hole reducing.

Another object is a combination tool for reducing the diameter of a hole that requires a minimum of torque.

Other objects will appear from time to time in the ensuing specification and drawing in which:

FIGURE 1 is a side view, partly in section, of a hole reducing tool prior to entering a hole;

FIGURE 2 is a section along line 2—2 of FIGURE 1;

FIGURE 3 is an enlarged side view, partly in section, showing the tool entering the hole;

FIGURE 4 is a side view, partly in section, similar to FIGURE 1, showing the tool fully inserted in the hole;

FIGURE 5 is a side view, partly in section, similar to FIGURE 3, showing the tool during withdrawal from the hole;

Figure 6:
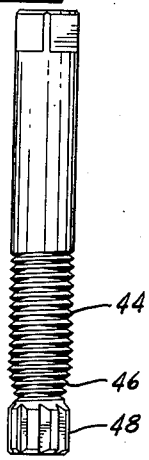
FIGURE 6 is a side view of a modified form of tool.

In FIGURE 1 a tap has been indicated at 10 with a shank 12, a squared end 14 which may be milled, ground or otherwise formed, and a threaded area 16 with a burnishing section 18 or the like at the lower end. The threaded section or area is shown with a single start V-shaped thread divided into a full thread area 20, a tapered area 22 and a reverse area 24. In the full thread area 20, the thread has a constant thread depth and the pitch diameter, crest diameter and root diameter undulate in a constant pattern, to be explained hereinbelow. In the tapered area 22 the thread is tapered inwardly so that the crest, pitch and root diameters uniformly decrease but the thread depth remains constant and is the same as in the full thread area 20. In the reverse area 24, the crest diameter remains approximately constant while the root and pitch diameters uniformly increase with the thread depth uniformly decreasing.

The thread forms or turns of the entire threaded section or area 16, as well as the burnishing section or area 18 at the end, may have relief areas longitudinally disposed or radially relieved areas. For example, the thread turns of the tapered area 22 and the full thread area 20 may be formed with varying outside, pitch and root diameters for each turn of the thread circumferentially of the tap. The tap is shown as divided into three sectors in FIGURE 2, designated A, B and C. The radius at the high points A, B and C is at a maximum and varies uniformly in the intermediate areas but with such variation the thread depth remains constant.

In the reverse area 24 and burnishing area 18, the radial reliefs are similarly applied but the fixed relationship between crest, pitch and root diameters is not maintained. Rather, as will be noted in FIGURES 3 and 5, the maximum diameter at the crest of the last turn or thread of the full thread area 20 is designated 26. Thereafter, the threads in the tapered area 22 decrease uniformly until the last thread of the tapered area is reached having a crest diameter designated 28. The thread with the crest 28 has a full thread depth or the same as the thread depth in the full thread area 20. In the reverse area 24, the crest diameter of the threads remains the same or constant while the root diameter increases, as at 30 and 32, with the thread depth decreasing. It will be noted that all of the threads in between, from 28 to the burnishing section 18, have an approximately constant crest diameter which is the same as the diameter 34 of the burnishing section.

The thread formation described above involving a "radial relief" may follow U.S. Patent No. 2,807,813, issued October 1, 1957. The point is that the threads are continuous and no cutting edges formed by relieved flutes are present.

The workpiece, designated 36, has a hole with an oversized diameter 37 and we prefer that the diameter of the hole be greater than or equal to the diameter of the burnishing portion 18, and approximately the same as or slightly greater than the pitch diameter of the full thread area 20 measured at A, B or C in FIGURE 2. Thus, when the tool is inserted and rotated in the hole, the burnishing section or area 18 and the reverse area 24 will freely enter, but the tapered area 22 will work the crest of its threads into the side of the hole in a smooth manner that does not cut the metal. Rather, the metal displaced by the crowns or crests of the threads will flow inwardly toward the root of the threads, as shown in FIGURE 3, to establish a thread form in the hole which approximates the thread form on the full thread area 20 of the tool.

In FIGURE 5 the tool is shown as being turned back out of the hole and it will be noted that the crests 38 of the threads formed in the hole have a diameter which is less than the diameter of the burnishing scetion 18. As the tool is turned out, the uniformly increasing roots 30 and 32 in the reverse area 24 will engage the crests 38 of the thread formation in the hole and, as shown in FIG- URE 5, will flow or force the material outwardly until it reaches the diameter 34 of the burnishing section. The completed hole will have an inner surface resembling that indicated at 40 in FIGURE 5. Since the diameter is "shrunk" somewhat and the material used to reduce the diameter has been taken from the body of the workpiece, voids are left in the form of a continuous helical groove or spiral 42. After the tool 10 is completely backed out, the entire inner surface of the hole will have this spiral groove 42 and the amount of shrinkage effected will be the difference between the original diameter of the hole and the diameter 34 of the burnishing section 18, which is shown as the clearance between the burnishing section and the hole in FIGURE 3. The total volume of the helical indentation or groove 42 should be, in theory, precisely equal to the final volume of the material displaced inwardly, but in reality it will be slightly greater since the material will be compressed somewhat.

It should be noted that all areas or sections of the tool and specifically including the burnishing section 18 may be provided with the radial reliefs indicated above. It is not necessary to apply the radial reliefs to the shank 12, of course. We have shown the relieved areas as rectilinear, when viewed from the side, and axially disposed, but it should be understood that such relieved areas on one thread might be offset slightly with relation to the relieved areas on the adjacent threads so that the radial reliefs would establish a helical or spiral pattern on the entire threaded area 16. We have also shown only a single start thread, but we might use double, triple or what have you.

Another important point is that when the tool is inserted and turned into a hole, a void will exist between the full thread area 20 and the burnishing section 18 due to the tapered and reverse areas 22 and 24. This void, designated D in FIGURE 3, will extend for several thread turns and may be used as a lubricant reservoir. The clearance around the burnishing section 18 will allow only a small amount of leakage. Excessive lubricant may escape through the relieved areas. Lubricant will be entrapped between the burnishing section 18 and the full thread area 20 and will serve to lubricate the burnishing section and to prevent scoring when the tool is removed.

Figure 7:
FIGURE 7 is a bottom view of the tool in FIGURE 6.

In FIGURES 6 and 7, we have shown a variant form in which a combined tool with an area 44 of full thread flows into a tapered area 46, both of which may be the same as the corresponding areas on the tool in FIGURES 1 through 5. The end of the tool is provided with a reamer section 48 having a plurality of relieved lands 50 and grooves 52. The effective diameter of the high point or cutting edge on the lands of the reamer section should be between the pitch and outside diameters of the full thread area 44. In this case, instead of swaging or working the metal back into the voids, as is done by the burnishing section in FIGURES 1 through 5, the excess metal worked up by the full thread is cut off or positively removed by the reamer section which may be formed in a conventional manner. The diameter of the reamer section is such that it will easily pass down through the hole initially, but will remove the excess material on the return stroke. Since the reamer section must be effective when the tool is being turned out of the hole, the flutes of the reamer should be the opposite hand from the full thread area 44. If the full thread 44 is right-hand, the reamer must be left-hand, in effect.

Figure 8:
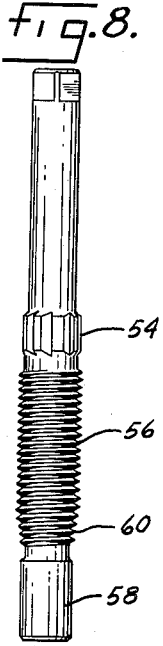
FIGURE 8 is a side view of a further variant.

In FIGURE 8 a variation is shown in which a reamer section, designated 54, is disposed after a full thread area 56, rather than ahead of it. We position a pilot 58 ahead of the tapered area 60. The FIGURE 8 tool is a straight through instrument while the FIGURE 6 modification is an in-and-out tool and may be used in a blind hole. The pilot 58 is purely optional.

Figure 9:
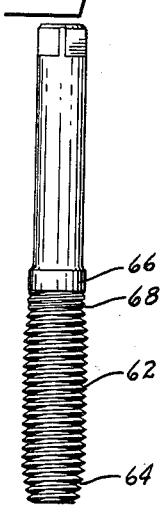
FIGURE 9 is a side view of an additional variation.

In FIGURE 9 we have shown a further variation in which the full thread area 62 may be as before with a tapered area 64. But instead of having the burnishing section at the bottom or ahead, as in FIGURES 1 through 5, we put it after the full thread area, as at 66, and we may use a reverse section 68 between them. The FIGURE 9 tool is therefore a straight through proposition rather than an in-and-out tool.

Figure 10:
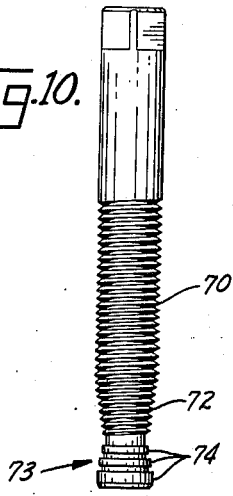
FIGURE 10 is a modified form.

In FIGURE 10 we have shown a further variation which may have a full thread area 70 and a tapered area 72. A burnishing section 73 is formed at the lower end with a plurality of relieved rings 74 which increase in diameter, as shown, and are not formed as a helical thread. In this case, a reverse section may not be used. The point is that each ring, as the tool is withdrawn from the hole, will work the metal in the raised area back into the grooves until the largest ring 74 at the lower end establishes the final diameter.

The threads need not necessarily be helical. For example, in FIGURES 11 through 13, we have shown a modification in which the threads 76 are in the form of axially disposed lands and grooves arranged longitudinally along the outer surface of the working area 78. As such, the working area 78 may be considered as a multi-start screw with infinite pitch. It will be noted that the lands increase in diameter from the smallest 80 at the bottom to the largest 82 at the top, and relieved areas in the form of spaced rings 84 are provided which increase in diameter upwardly. These annular rings or reliefs operate substantially in the same manner as the radial reliefs in the A, B, C sector in FIGURE 2.

Figure 11:
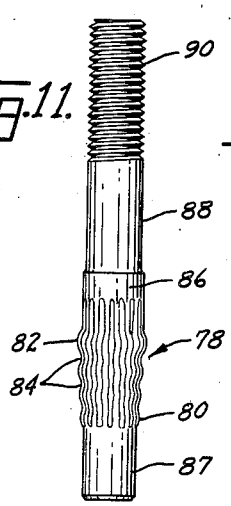
FIGURE 11 is a further modification.
Figure 12:
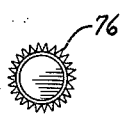
FIGURE 12 is a bottom view of FIGURE 11.

The material raised from the inner surface of the hole will not be in the form of a spiral thread, but rather will be merely axially disposed flutes. After it is raised, it may be returned to the desired diameter by a burnishing tool or any other sizing portion. In FIGURE 11 we have shown a burnishing portion or collar 86 with longitudinal grooves gradually merging into this burnishing section and the tool may also have a pilot 87.

One use of the FIGURE 11 form is as a stud which may be secured in a hole. For example, the shank 88 might be threaded at 90 to accept a nut. Instead of being turned or screwed into a hole, the tool might be driven by a hammer or otherwise. The collar or burnishing portion 86 might be formed as a ring or flange below the threaded area 78 on or in place of the pilot 87. The flutes and relieved areas deform the material on the inner surface of the hole inwardly into radially disposed fins which project within the diameter of the collar portion. Thus, the collar will resist subsequent withdrawal of the stud.

Figure 13:
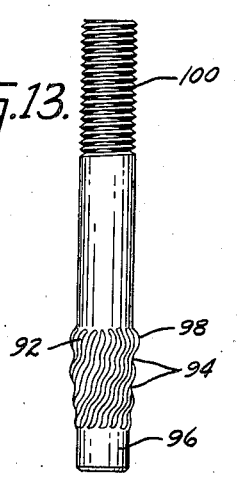
FIGURE 13 is a modification of FIGURE 12.

In FIGURE 13 a variant form has been shown in which the flutes or grooves 92 are formed with a slight helix or right-hand twist, when viewed from above. As before, annular relief areas 94 are used and a collar portion 96 is disposed below with a diameter on the order of the pitch diameter of the portion 98 of the ribs having the largest outside diameter. When the stud is driven into a hole, the shaft will turn slightly clockwise, when viewed from above, due to the helix or twist of the grooves 92. The upper end of the shaft may be threaded at 100 so that a conventional nut may be applied. It should be noted that the threads 100 are also right-hand, like the helix or twist on the grooves 92. Thus, when the shaft is fully driven into a hole, be it a blind hole or otherwise, and the metal on the inner surface of the hole has been worked inwardly by the grooves so that it lies within the diameter of the collar 96, the stud will resist withdrawal. When a nut is turned fully down on the threaded upper end 100 and is in engagement with the flat surface on top of the whole, the torque applied to the stud due to rotation of a nut will be clockwise, which is against the direction of the helical interfit between the lands and grooves 92 and the internal fins formed in the hole.

The use, operation and function of the invention are as follows:

The invention is concerned with a method for varying the size of a cylindrical surface, be it a hole, shaft or otherwise. For clarity, the description has been and will be confined to hole size reduction.

The general procedure is to draw, force or work spaced areas on the inside of a hole in from the original diameter to a diameter smaller than that desired, then to work the material outwardly until the desired diameter is reached. Or the excess material between the smaller diameter and the desired diameter might be cut off or otherwise removed. In either case, grooves, either spiral or straight, will be left in the inner surface which may function as passages for fluid, for example a lubricant.

The procedure has the advantage that the resulting surface with its new diameter will be work-hardened. If only a work-hardened surface is desired when using a tool such as shown in FIGURE 5, the burnishing section 18 might have an effective diameter which is the same or approximately the same as the original diameter of the hole. The diameter of the hole will be returned to the original diameter, and the surface will be quite hard and wear-resistant. Such a procedure would be particularly advantageous on stainless steel.

The particular metal-working tool shown has the advantage that the relief areas substantially reduce the torque required to turn or force the tool. In FIGURE 2 only three such radial reliefs have been shown, but four, five, six, etc. might be used. Just so the number is not so large that the radial reliefs have little or no effect. A single start screw has been shown in FIGURES 1 through 5, but it might be double, triple or what have you. We have referred to and emphasized repair work, but it might be used on original equipment as well.

In the form in FIGURES 1 through 5, the combination of the full thread area, the tapered area, the reverse area, and the burnishing area provides a combination tool which will automatically shrink the hole to a predetermined size. It should be noted, in FIGURE 2, that the radial reliefs are applied to all areas.

The procedure or method has been outlined as including the steps of working the material inwardly from the original diameter to a "too small" diameter and thereafter working back or removing the excess to get the desired diameter which is less than the original. In short, we first draw or work the material in, then force it back, or remove it, to the desired diameter which is between the too large original diameter and the too small first step diameter. But it is within the scope of our invention to size the material accurately when initially working it in from the original diameter. For example, in FIGURE 3, the root diameter, designated at X, of the full thread form might be precisely at the desired final diameter, and the thread formation of the full thread area might be proportioned as to pitch diameter, crest diameter and pitch, relative to the original "too large" diameter of the hole such that the displaced material between the threads would flow in and precisely and exactly coincide, or approximately so, with the root diameter X so that resizing by the reverse area and burnishing area would not be necessary.

The FIGURE 6 form has the advantage that it is inexpensive. We might merely buy a straight shank with a small reamer section, as at 48, at the end and thereafter apply the full thread area 44 and the tapered area 46 to it. It also has the advantage that it may be used accurately on a blind hole whereas other tools, such as the one in FIGURE 8, are for a straight through operation.

The direction of the grooves on the tool might be anywhere from a single start thread helix, as in FIGURES 1 through 10, to a straight linear groove, as in FIGURE 11, or any place in between. The grooves might go around at 45 or a 60 degree angle, such as in FIGURE 13.

The sides of the threads in the various areas may be at any suitable angle, for example, 40, 50 or 60 degrees. The tool might be used with workpieces made of die cast aluminum, brass, bronze, plastics, certain steels or any ductile or semi-ductile metals. Broadly, a metal should be capable of cold work but the invention is not limited to any particular material. While we have designated ductile materials, since these are the most easily worked, other relatively non-ductile materials will also respond favorably.

Whereas the preferred form and several variations of the invention have been shown and described and suggested, it should be understood that suitable additional modifications, changes, substitutions and alterations may be made without departing from the invention's fundamental theme. We, therefore, wish the invention be unrestricted, except as by the appended claims.

We claim:

1. A tool for sizing a cylindrical workpiece, including a body portion with a threaded area, the threads of which have a constant thread depth and predetermined root, pitch and crest diameters, the threads having a series of radially relieved sectors with intermediate high points and being continuous and uninterrupted at least at the high points and on each side thereof, and a metal sizing area adjacent the threaded area with an effective diameter between the pitch and root diameters of the threaded area.

2. The structure of claim 1, characterized in that the tool is a tap and further includes a tapered area between the threaded and metal sizing areas in which the root, pitch and crest diameters uniformly decrease with the thread depth remaining constant, until the crest diameter is approximately the same as the effective diameter of the metal sizing area, and a reverse area between the tapered and metal sizing areas in which the thread depth decreases, the root diameter increases and the crest diameter remains generally constant.

3. The structure of claim 2 further characterized in that the areas are formed with a series of successive radially relieved sectors circumferentially thereof.

4. The structure of claim 1 in which the metal sizing area has reaming flutes formed thereon.

5. The structure of claim 1 further characterized in that the metal sizing area includes a plurality of axially spaced rings which increase in diameter away from the threaded area.

6. A tool for sizing a cylindrical workpiece, including a body portion with a metal deforming area having a plurality of lands and grooves with a series of successive radially relieved sectors, the metal deforming area being substantially uniform in cross section and of substantially equal depth taken in all planes intersecting the axis of the tool, and a metal sizing area on the body adjacent the metal deforming area and having an effective diameter between the lands and grooves of the metal deforming area.

7. The structure of claim 1 further characterized in that the threads are continuous and uninterrupted throughout.

8. The structure of claim 1 further characterized in that the metal sizing area is positioned ahead of the threaded area and has reaming flutes formed thereon, the effective direction of rotation of the flutes being the opposite of the threads so that the material of the workpiece will be displaced inwardly by the threaded area when the tool is rotated in one direction, and at least a part of the thus displaced material will be removed by the reaming flutes when the tool is rotated in the other direction.

9. The structure of claim 1 further characterized in that the metal sizing area is positioned behind the threaded area and has reaming flutes formed thereon which are effective when rotated in the same direction as the effective direction of rotation of the threads.

10. The structure of claim 9 further characterized by and including a pilot ahead of the threaded area having a diameter on the order of the pitch diameter of the threaded area.

References Cited in the file of this patent

UNITED STATES PATENTS

| | | |
|---|---|---|
| 832,076 | Oster | Oct. 2, 1906 |
| 2,157,354 | Sherman | May 9, 1939 |
| 2,373,901 | Lowery | Apr. 17, 1945 |
| 2,548,702 | Chamberlain | Apr. 10, 1951 |
| 2,641,822 | Sampson | June 16, 1953 |
| 2,722,259 | Eckenbeck | Nov. 1, 1955 |
| 2,807,813 | Welles | Oct. 1, 1957 |
| 2,828,493 | Koehler | Apr. 1, 1958 |